Patented Aug. 12, 1924.

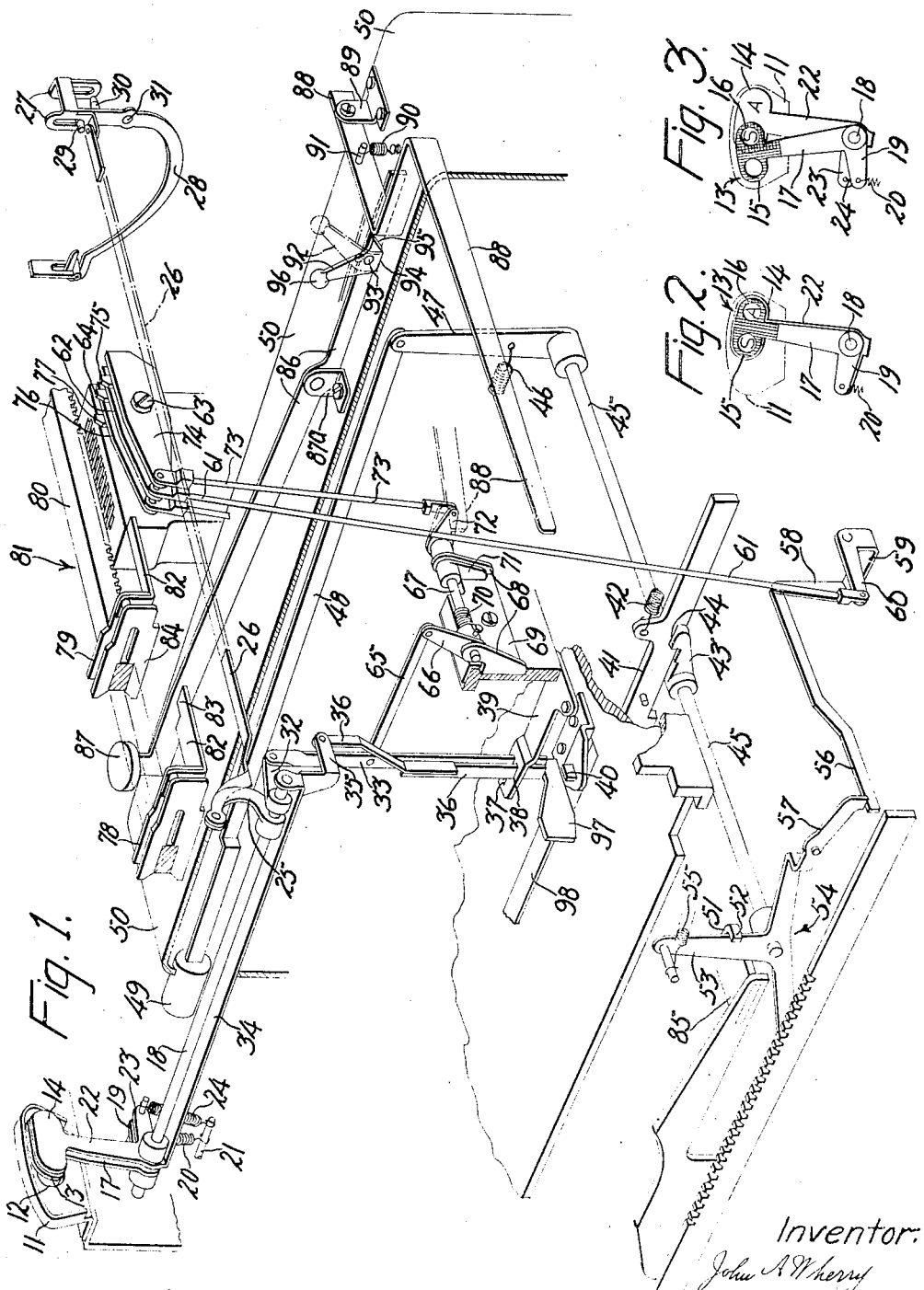

1,504,800

UNITED STATES PATENT OFFICE.

JOHN A. WHERRY, OF NEW ORLEANS, LOUISIANA, ASSIGNOR TO UNDERWOOD TYPE-WRITER COMPANY, OF NEW YORK, N. Y., A CORPORATION OF DELAWARE.

COMBINED TYPEWRITING AND COMPUTING MACHINE.

Application filed July 7, 1922. Serial No. 573,317.

*To all whom it may concern:*

Be it known that I, JOHN A. WHERRY, a citizen of the United States, residing in New Orleans, in the parish of Orleans and State of Louisiana, have invented certain new and useful Improvements in Combined Typewriting and Computing Machines, of which the following is a specification.

This invention relates to combined typewriting and computing machines, and is in the nature of an improvement on U. S. patent to Kupetz, No. 1,356,072, dated October 19, 1920, and a co-pending application of said Kupetz, Serial No. 244,250, filed July 10, 1918, (now Patent No. 1,452,162, dated April 17, 1923) in each of which the invention is illustrated as applied to a bookkeeping machine of the Underwood-Hanson type.

The machines disclosed in said patent and co-pending application are designed for the keeping of commercial accounts, as for example, in making statement and ledger postings in which numbers are printed in various colors and are additively and subtractively computed in the machines. In one form of such work, an old balance is first typed in the "old balance" column and run into the machine. If the item to be entered is a debit, it is then typed in black in the "debit" column and run additively into the machine. If the item is a credit, it is typed in red in the "credit" column and run into the machine subtractively. The balance shown after entering the item is then typed in the "balance" column and run into the machine subtractively to clear the machine or register. Usually the balance is a debit balance, and, although subtracted in the machine, it is desirable to print the same in black.

In order to obtain the desired results, use is made of a so-called red subtraction stop in the "credit" column and a so-called black subtraction stop for controlling the machine in connection with the "balance" column. The subtraction stops are spoken of as red or black subtraction stops because of the color in which items are typed in the corresponding columns when these subtraction stops are used. Sometimes the balance to be typed is a credit balance, and in this case the balance must be run additively into the machine to clear the same, and it is desirable in this connection to type the credit balance in red in the "balance" column. For this purpose, provision is made of a credit balance key, and suitable means controlled thereby for re-setting the machine for addition and for causing the typing to be effected in red.

Also when a black subtraction stop is used in connection with a given column, the machine, after being set to add and print in red, may be re-set to subtract, although the color-controlling mechanism remains set for printing in red. This result may be obtained by holding the credit balance key in depressed position and then depressing the subtraction key.

Said co-pending application is also provided with separate signals to indicate the state for which the machine is set and the color in which typing is to be effected, the two indications being shown at substantially the same point.

According to the present invention, provision is made of means whereby the machine can be thrown into black subtraction in connection with a column for which a red subtraction stop has been set on the carriage, and also in an addition column; the color signal and the state signal being governed accordingly.

In carrying out this invention, provision is made of a special key and mechanism controlled thereby, to effect the same change in the connections between the subtraction-setting mechanism and the color-changing mechanism as is ordinarily effected by a black subtraction stop, so that, upon setting the machine for subtraction by means of the usual subtraction key, the color-controlling mechanism will be set for printing in black.

Provision may also be made of means for maintaining the special key in depressed position.

It should be understood that the invention, although embodied in connection with a credit balance machine, is in its broader aspects entirely independent of the credit balance features and may be applied to machines in which they are omitted.

Other features and advantages will hereinafter appear.

In the accompanying drawings,

Figure 1 is a skeleton perspective view showing my invention applied to so much of a credit balance machine of the Underwood-Hanson type as is necessary for the purpose of illustration.

Figure 2 is a view showing the setting of the color signal and the state signal when subtraction is to be effected and typing is to be effected in red.

Figure 3 is a view similar to Figure 2, but showing the signals set to indicate that typing is to be effected in black in connection with subtraction.

In the machine disclosed herein, provision is made of a shield 11 in the upper right-hand part of the machine and having a sight opening 12 through which the color indications on a color signal 13 and the addition and subtraction indications on a state signal 14 may be viewed. As shown in Figures 2 and 3, the state signal 14 is provided with an "A" indicating addition and an "S" indicating subtraction, and the color signal 13 is provided with a red field 15 and a black field 16 corresponding to the red and black fields of a two-color ribbon to be used in the machine. Each of the color fields of the color signal 13 has a circular opening therein of sufficient size to permit either the "A" or the "S" on the state signal 14 to be viewed therethrough, the sight 12 and the shield 11 being of sufficient size to permit a portion of the color signal 13 around each of the openings to be seen through the sight 12.

The color signal 13 is mounted on the upper end of an upright arm 17 fixed on a shaft 18, said upright arm 17 having connected therewith an arm 19 extending substantially at right angles to the arm 17. A spring 20 is connected at one end to the outer end of the arm 19, and at the other to a pin 21 below the shaft 18 and mounted on a fixed part of the machine. In the same manner, the state signal 14 is supported on the upper end of an arm 22 pivotally mounted on the shaft 18 and having an arm 23 connected therewith and extending substantially at right angles thereto. The outer end of the arm 23 is connected by a spring 24 with the pin 21. It will be evident that the springs 20 and 24 tend to swing the color signal 13 and the state signal 14 to the left, looking at the front of the machine, so as to display the "A" of the state signal and the black portion of the color portion at the sight 12.

Fixed on the shaft 18 at a point considerably to the rear of the state and color signals is an arm 25, to the upper end of which is pivoted a link 26 connected at its other end with a slotted frame 27 by which the movement of a usual ribbon-vibrator lever 28 is controlled. The slotted frame 27 is mounted for transverse movement on the usual universal frame, not shown, which is operated each time a type-bar is swung to printing position. The connection between the slotted frame 27 and the ribbon-vibrator lever 28 is effected by means of pins 29 and 30, respectively, projecting from opposite sides of the ribbon-vibrator lever 28, and at different distances from a pivot 31 of the lever 28. As seen in Figure 1, the slotted frame is connected with the pin 29, which is located farther from the pivot 31 than is the pin 30, and consequently the ribbon-vibrator lever is given a shorter swing than would be the case if the pin 30 were engaged with the adjacent slotted portion of the frame 27. It will be evident that, if the color signal is swung to the right, as shown in Figure 2, the frame 27 will be shifted to the right, as seen from the front of the machine, to engage the pin 30 and to be disengaged from the pin 29. Mounted on the rear end of the shaft 18 is an arm 32 by which the shaft 18 may be turned against the action of the spring 20. Such action may be effected through a depending link 33 pivoted at its upper end to the outer end of the arm 32.

The arms 22 and 23 for controlling the state signal 13 form part of a bail 34 pivoted at its rear end on the shaft 18 adjacent the arm 32, and the bail is provided at its rear end with an arm 35 having pivoted thereto at its outer end the upper end of a link 36. At their lower ends the links 33 and 36 are guided in slots 37 and 38, respectively, said slots being formed in a bracket 39 attached to a fixed part of the frame of the machine. Immediately beneath the lower ends of links 33 and 36 is the upper end of a plunger 40, which is given an upward movement upon every rearward movement of a subtraction bar 41, under the influence of a spring 42. The plunger 40 corresponds to the plunger 95 shown in Figure 6 of said prior application, Serial No. 244,250, as operated by an arm extending rearwardly from a bell-crank 59 operable by a subtraction bar 56. Such upward movement of the plunger 40 will cause both of the links 33 and 36 to be lifted and the color signal and state signal to be shifted to the right, to the position shown in Figure 2. The subtraction bar 41 is normally held in its forward position by a hook 43 engaging in a notch 44 at the lower edge of the subtraction bar, said hook 43 being fixedly mounted on a shaft 45, which is normally urged to swing the hook 43 into effective position by means of a spring 46 connected at its rear end to an arm 47 fixed on the shaft 45. At its upper end the arm 47 is pivoted to the rear end of a link 48, having on its forward end the usual subtraction key 49, which extends through a suitable opening in the usual computer casing 50, which is here shown as projecting laterally beyond the sides of the typewriter. Upon depression of the subtraction key 49, the hook 43 will be withdrawn from the notch 44 and the subtraction bar released to be drawn rearwardly by its spring 42.

The rocking of the shaft 45 to release the subtraction bar 41 may also be effected automatically. To this end, provision is made at the right-hand end of the shaft 45 of an arm 51 fixed thereon and having at its upper end a lug 52 extending around the rear edge of an arm 53 of a three-arm lever 54 loosely mounted on the shaft 45 and normally urged to turn in a clockwise direction, as seen in Figure 1, by a spring 55. This turning movement of the three-arm lever 54 is normally prevented by means of a latch 56 extending under the rear end of a rearwardly-extending arm 57 of said three-arm lever 54. The latch 56 is pivoted at its other end to the upright arm 58 of a pivoted bail 59, provided at its other end with an arm 60, to which is pivoted the lower end of a link 61. The upper end of the link 61 is pivotally connected to a subtraction trip lever 62, pivotally mounted on a pivot screw 63 and provided with an upwardly-extending tappet 64 to be engaged by subtraction stops, to be described hereinafter. Upon depression of the tappet 64, the latch 56 will be withdrawn from the path of the arm 57, and the subtraction bar 41 will be released.

To permit the color-signal mechanism to be freed from the control of the plunger 40, the slot 37 in the bracket 39 is made of sufficient length to permit the link 33 to be shifted to one side of the plunger 40, where, as disclosed in said prior application, Serial No. 244,250, it may be actuated by other means. For shifting the link 33 out of the path of the plunger 40, provision is made of a link 65 pivoted at its forward end to the link 33 and at its rear end to an arm 66 fixed on a rock-shaft 67. The rock-shaft 67 is journaled in brackets 68 formed on a plate 69 secured to a fixed portion of the machine, and is normally urged to draw the link 65 rearwardly by means of a spring 70 connected at one end with the shaft 67 and at the other to a fixed part of the machine. The movement of the shaft 67 under the action of the spring 70 is limited by means of an arm 71 fixed on the shaft 67 and normally in engagement with the rear face of the plate 69. The shaft 67 may be actuated against the urging of the spring 70 by means of an arm 72, fixed on said shaft and having pivoted thereto at its rear end a link 73, which in turn is pivoted at its upper end to a lever 74, mounted on said pivot-screw 63 and provided with an upwardly-projecting tappet 75.

To operate the subtraction trip lever 62 and the lever 74 and also a motor-trip lever 76 provided with a tappet 77, provision may be made of suitable stops such as stops 78 and 79 shown in adjusted position on a rack 80 supported at the rear of and forming part of a carriage, denoted in general by 81.

Both of the stops 78 and 79 are subtraction stops; that is, they are so constructed as to engage and actuate the tappet 64 of the subtraction lever 62 as the carriage approaches the corresponding computing zone, and will thereby effect the setting of the computing mechanism for subtraction. When the machine is set for subtraction by means of an extension 82 of the stop 79, the plunger 40 will lift the link 33, and printing will be effected in red. When, however, the carriage enters a computing zone corresponding to the position of the stop 78, an extension 83 of the stop 78 will engage the tappet 75 on the lever 74 and shift the link 33 rearwardly out of the path of the plunger 40, so that, when the subtraction lever 62 is operated by the extension 82 of the stop 78, the plunger 40 will pass to the rear of the link 33; the color-controlling mechanism being left in such condition that typing will be effected in black.

For convenience in referring to subtraction stops of the two forms shown, the stop 78 may be called a black subtraction stop and the stop 79 may be called a red subtraction stop. If desired, the subtraction stop 78 may be black in color and the subtraction stop 79 red. As the carriage travels out of the computing zone corresponding to either of the stops 78 and 79, a downward projection 84 on the effective stop will engage the tappet 77 on the motor-trip lever 76 and effect actuation of a general operator 85 in the usual manner. In connection with zones in which addition is to be effected, use is made of addition stops which differ from the subtraction stops in that the extensions 82 and 83 are omitted. Such addition stops correspond to the addition stops shown in Figure 13 of said prior application, Serial No. 244,250.

In carrying out the invention, provision is made of a lever 86 pivoted intermediate of its ends on a bracket 87ª secured to the upper face of the computer casing 50 at the left of the typewriter, the forward end of the lever or key-lever 86 being provided with a key 87. A transverse lever 88 is pivoted at its outer end on a bracket 89 secured to the top of the casing 50, and this lever 88 overlies the rear end of the lever 86 and is drawn downwardly by a spring 90 attached at its upper end to a pin 91 on the lever 88 and at its lower end to the casing 50. As shown on Figure 1, the arm of lever 86 at the rear of its fulcrum is offset downwardly with respect to the power arm of said lever and normally rests on the upper surface of the computer casing 50.

When the key 87 is depressed, the inner end of the transverse lever 88 will be swung upwardly to engage the arm 72 on the rockshaft 67 and raise it to the dot-and-dash position shown in Figure 1, such movement of the shaft 67 causing link 33 to be shifted to the front, out of the path of the plunger 40, thereby freeing the bichrome mechanism from control by the subtraction-setting bar 41.

For some classes of work it may be desirable to hold the key 87 in depressed position. To this end, a short lever 92 may be pivoted at 93 on the rear arm of the lever 86, said lever 92 having its lower end so shaped that, when the lever is in the full-line position shown in Figure 1, a flat portion 94 at the lower end of the lever will be in engagement with the upper surface of the computer casing 50, but, when the lever is swung to its rearward dot-and-dash position shown in Figure 1, a flat portion 95 at a greater distance from the pivot 93 than the flat portion 94 will be brought into position to rest on the upper surface of the computer casing 50, and the rear end of the lever 86 will be held in its raised position, as shown in the dot-and-dash lines in Figure 1. The lever 92 is provided with a head 96 of considerable weight, which will tend to hold the lever 92 either in its forward or rearward position. When the key 87 is held in depressed position, the color-changing mechanism will not be affected in any way by the movement of the carriage into a zone for which either a black subtraction stop or a red subtraction stop is set.

When the link 33 is in its forward position, it may be lifted by a cam member 97 carried by a member 98. The cam member 97 corresponds to the cam 111 of said prior application, Serial No. 244,250, which is mounted on a bell-crank 110 swingable about a fulcrum 110ª, the bell-crank 110 being connected with a stem 113 of a credit balance key 108. As shown in Figure 4 of said prior application, depression of the credit balance key 108 also serves to trip the motor and actuate the general operator 48.

Variations may be resorted to within the scope of the invention, and portions of the improvements may be used without others.

Having thus described my invention, I claim:

1. In a combined typewriting and computing machine normally set for addition, in combination, a carriage whereby computing zones may be determined, bichrome mechanism normally set for typing in one color, means for setting the machine for subtraction, a train of mechanism actuable by the subtraction-setting means for shifting said bichrome mechanism for printing in a second color, a special key adjacent the keyboard, and special-key-actuated means for disabling said train to free the bichrome mechanism from control by the subtraction-setting means.

2. In a combined typewriting and computing machine normally set for addition, in combination, a carriage whereby computing zones may be determined, bichrome mechanism normally set for typing in one color, means for setting the machine for subtraction, a subtraction stop on said carriage to effect actuation of the subtraction-setting means and shifting of said bichrome mechanism, a train of mechanism actuable by the carriage to prevent shifting of the bichrome mechanism by the subtraction stop, a special key at the keyboard, and special-key-actuated means to actuate said train for restoring the bichrome mechanism to its normal setting to nullify the shifting of the bichrome mechanism by the subtraction stop.

3. In a combined typewriting and computing machine normally set for addition, in combination, a carriage whereby computing zones may be determined, means for setting the machine for subtraction, bichrome mechanism normally set for typing in one color and shiftable only by said subtraction-setting means, a subtraction stop on said carriage for effecting actuation of the subtraction-setting means and shifting of said bichrome mechanism, a second subtraction stop for effecting actuation of said subtraction-setting means without shifting the bichrome mechanism, a special key at the keyboard, and special-key-actuated means for breaking the connection between the bichrome mechanism and the subtraction-setting means to restore the bichrome mechanism to its normal setting and thereby nullify the shifting of the bichrome mechanism by the first-mentioned subtraction stop.

4. In a combined typewriting and computing machine normally set for addition, in combination, a carriage whereby computing zones may be determined, bichrome mechanism normally set for typing in one color, means for setting the machine for subtraction, means actuable by the subtraction-setting means for shifting said bichrome mechanism for printing in a second color, an interponent through which said shifting means acts on said bichrome mechanism, means for shifting said interponent to ineffective position, a subtraction stop on said carriage to cause said subtraction-setting means to act, a special key at the keyboard, and special-key-actuated means, including a forwardly and a rearwardly extending lever and a transversely-extending lever, for shifting said interponent to ineffective position to disable the bichrome mechanism shifting means in the zone corresponding to the setting of said subtraction stop.

5. In a combined typewriting and computing machine normally set for addition, in combination, a carriage whereby computing zones may be determined, bichrome mechanism normally set for typing in one color, means for setting the machine for subtraction, a train actuable by the subtraction-setting means and constituting the only means for shifting said bichrome mechainsm for printing in a second color, a subtraction stop on said carriage to cause said subtraction-setting means to act, a second subtraction stop having provisions to disable said train, a special key at the keyboard, and means actuated by said special key to disable said train to nullify actuation of the bichrome mechanism by the subtraction-setting means in the zone corresponding to the setting of the first-mentioned subtraction stop.

6. In a combined typewriting and computing machine, in combination, a state signal having addition and subtraction indications thereon to be displayed at an observation point, a color signal forward of said state signal and having two color indications thereon to be displayed at said observation point, said addition and subtraction indications being displayed through said color indications at the observation point, two adjacent members, one connected to said state signal and the other with said color signal, for operating said signals, a state-setting device having provisions to operate both of said members, means for automatically shifting the color-signal-operating member out of operative relation with said state-setting device, and manual means operable from the keyboard for shifting said color-signal-operating member out of operative relation with said state-setting device.

7. In a combined typewriting and computing machine, in combination, bichrome mechanism to determine in which of two colors typing is to be effected, a color signal connected with said bichrome mechanism to indicate at an observation point the setting of said bichrome mechanism, a state signal to be observed at said observation point, state-setting mechanism, automatic means for controlling the action of said state-setting mechanism, signal-operating means actuable by said state-setting mechanism and normally having an operative connection with each of said signals, automatic means for destroying the operative connection between said signal-operating means and said bichrome mechanism, a key at the keyboard, and means operable by said key for destroying the effective connection between said signal-operating means and said bichrome mechanism.

8. In a combined typewriting and computing machine, in combination, bichrome mechanism to determine in which of two colors typing is to be effected, a color signal connected with said bichrome mechanism to indicate at an observation point the setting of said bichrome mechanism, a state signal to be observed at said observation point, state-setting mechanism, automatic means for controlling the action of said state-setting mechanism, signal-operating means actuable by said state-setting mechanism and normally having an operative connection with each of said signals, automatic means for destroying the operative connection between said signal-operating means and said bichrome mechanism, said automatic means comprising a substantially horizontal arm, and manually operable means for destroying the effective connection between said signal-operating means and said bichrome mechanism, said manually operable means comprising a lever having one end pivoted at one side of the machine and co-operating at its other end with said horizontal arm, and a key-lever pivoted on the same side of the machine as the first-mentioned lever and having a key at its front end and its rear end co-operating with said first-mentioned lever.

9. In a combined typewriting and computing machine in which the typewriter is set on a computer casing which projects laterally beyond the side of the typewriter, in combination, a carriage, color-signal mechanism comprising a depending link on which it may be shifted from its normal to an abnormal position, state-signal mechanism comprising a depending link by which it may be shifted from a normal addition indication to a subtraction indication, subtraction-setting mechanism, a reciprocable member operable by said subtraction-setting mechanism to engage the lower ends of said links and operate said color-signal and state-signal mechanisms, means for shifting the color-signal link out of the path of the reciprocable member, a stop on said carriage for actuating said shifting means and said subtraction-setting mechanism, and separate means for actuating said shifting means, comprising a key at the front of the machine, a key-lever for said key extending rearwardly along one side of the typewriter and pivoted intermediate its ends on the laterally-projecting portion of the computer casing, and a transverse lever pivoted at its outer end on said projecting portion and extending inwardly over the rear end of the key-lever to a position to co-operate with said shifting means.

10. In a combined typewriting and computing machine in which the typewriter is set on a computer casing which projects laterally beyond the side of the typewriter, in combination, a carriage, color-signal mechanism comprising a depending link on which it may be shifted from its normal to an abnormal position, state-signal mechanism comprising a depending link by which it may be shifted from a normal addition indication to a subtraction indication, subtraction-setting mechanism, a reciprocable member operable by said subtraction-setting mechanism to engage the lower ends of said links and operate said color-signal and state-signal mechanisms, means for shifting the color-signal link out of the path of the reciprocable member, a stop on said carriage for actuating said shifting means and said subtraction-setting mechanism, and separate means for actuating said shifting means, comprising a key at the front of the machine, a key-lever for said key extending rearwardly along one side of the typewriter and pivoted intermediate its ends on the laterally-projecting portion of the computer casing, a transverse lever pivoted at its outer end on said projecting portion and extending inwardly over the rear end of the key-lever to a position to co-operate with said shifting means, and means for detaining said key-lever in its operated position.

11. In a combined typewriting and computing machine in which the typewriter is set on a computer casing which projects laterally beyond the side of the typewriter, in combination, a carriage, color-signal mechanism comprising a depending link on which it may be shifted from its normal to an abnormal position, state-signal mechanism comprising a depending link by which it may be shifted from a normal addition indication to a subtraction indication, subtraction-setting mechanism, a reciprocable member operable by said subtraction-setting mechanism to engage the lower ends of said links and operate said color-signal and state-signal mechanisms, means for shifting the color-signal link out of the path of the reciprocable member, a stop on said carriage for actuating said shifting means and said subtraction-setting mechanism, and separate means for actuating said shifting means, comprising a key at the front of the machine, a key-lever for said key extending rearwardly along one side of the typewriter and pivoted intermediate its ends on the laterally projecting portion of the computer casing, a transverse lever pivoted at its outer end on said projecting portion and extending inwardly over the rear end of the key-lever to a position to co-operate with said shifting means, and means to detain said transverse lever in its operated position.

12. In a combined typewriting and computing machine in which the typewriter is set on a computer casing which projects laterally beyond the side of the typewriter, in combination, a carriage, color-signal mechanism comprising a depending link on which it may be shifted from its normal to an abnormal position, state-signal mechanism comprising a depending link by which it may be shifted from a normal addition indication to a subtraction indication, subtraction-setting mechanism, a reciprocable member operable by said subtraction-setting mechanism to engage the lower ends of said links and operate said color-signal and state-signal mechanisms, means for shifting the color-signal link out of the path of the reciprocable member, a stop on said carriage for actuating said shifting means and said subtraction-setting mechanism, and separate means for actuating said shifting means, comprising a key at the front of the machine, a key-lever for said key extending rearwardly along one side of the typewriter and pivoted intermediate its ends on the laterally-projecting portion of the computer casing, a transverse lever pivoted at its outer end on said projecting portion and extending inwardly over the rear end of the key-lever to a position to cooperate with said shifting means, and means for detaining said key-lever in its operated position, said detaining means comprising a short detent-lever pivoted on said key-lever adjacent the rear end of the latter and having its lower end so shaped that when the detent-lever is in one of its limiting positions, the rear end of said key-lever may lie in its depressed position, and when the detent-lever is in its other limiting position, the rear end of the key-lever will be held in raised position.

13. In a combined typewriting and computing machine which is normally set for addition, in combination, bichrome mechanism normally set for one color but shiftable to a setting for a second color, a color signal connected to said bichrome mechanism to indicate the color in which the typing is to be effected, a depending link connected at its upper end to said bichrome mechanism to and providing the only means for shifting the same for typing in the second color, subtraction-setting mechanism, a reciprocable member beneath said link whereby the latter may be actuated, said reciprocable member being actuated by the subtraction-setting mechanism, a subtraction stop for starting said subtraction-setting mechanism, means actuated by said subtraction stop for shifting said link out of the path of said reciprocable member, a special key at the front of the machine, and means actuable by said special key to actuate said shifting means to permit black subtraction in a computing zone in which said shifting means is not actuated by a subtraction stop.

14. In a combined typewriting and computing machine normally set for addition, in combination, a carriage whereby computing zones may be determined, subtraction-setting means, bichrome mechanism normally set for black typing but shiftable for red typing and actuable only by said subtraction-setting means, a red subtraction stop to actuate said subtraction-setting means and to shift said bichrome mechanism for red typing in a red subtraction zone, a black subtraction stop to set said machine for subtraction and black typing in a black subtraction zone, a special key at the front of the machine, and special-key-actuated means to enable the machine to be set for black subtraction either in an addition zone or in a red subtraction zone.

15. In a combined typewriting and computing machine, computing mechanism normally set for addition, subtraction-setting mechanism therefor, bichrome mechanism, a train of connections normally actuable by said subtraction-setting mechanism and constituting the sole means for controlling the bichrome mechanism, and means for disabling said train for actuating the bichrome mechanism, said disabling means including a key accessible to an operator at the keyboard, a rearwardly-extending element operable by said key, and a transversely-extending element operable by said rearwardly-extending element.

16. In a combined typewriting and computing machine, computing mechanism normally set for addition, subtraction-setting mechanism therefor, bichrome mechanism, a train of connections normally actuable by said subtraction-setting mechanism and constituting the sole means for controlling the bichrome mechanism, and means for disabling said train for actuating the bichrome mechanism, said disabling means including a key accessible to an operator at the keyboard, and a device operable by said key and extending therefrom around the side and rear of the machine into operative relation with said train.

17. In a machine of the kind described, the combination with a traveling carriage, writing instrumentalities, and computing mechanism, of a bichrome ribbon, ribbon-shifting mechanism constructed for operation automatically to shift the ribbon upon the entering of the carriage into a subtraction zone, means arranged automatically to disable the ribbon-shifting mechanism at a predetermined stage to prevent shifting of the ribbon in a part of the subtraction zones, a special key adjacent the key-board, and means operable by the special key to disable the ribbon-shifting mechanism in the zones in which said automatically-acting disabling means is not effective.

JOHN A. WHERRY.

Witnesses:
J. N. SWING,
E. HENRY.